US006959050B2

(12) United States Patent
Baum et al.

(10) Patent No.: US 6,959,050 B2
(45) Date of Patent: Oct. 25, 2005

(54) METHOD AND APPARATUS FOR SYNCHRONIZING AN OFDM SIGNAL

(75) Inventors: Kevin L. Baum, Rolling Meadows, IL (US); Nikhil S. Nadgauda, Hoboken, NJ (US)

(73) Assignee: Motorola, Inc., Schaumburg, IL (US)

(*) Notice: Subject to any disclaimer, the term of this patent is extended or adjusted under 35 U.S.C. 154(b) by 863 days.

(21) Appl. No.: 09/882,840

(22) Filed: Jun. 15, 2001

(65) Prior Publication Data

US 2003/0026295 A1 Feb. 6, 2003

(51) Int. Cl.[7] .......................... H04L 27/14; H04L 27/06

(52) U.S. Cl. ........................ 375/326; 375/316; 375/324

(58) Field of Search ................................ 375/326, 316, 375/325, 327, 222, 147, 364, 365, 354, 341, 340, 346, 130

(56) References Cited

U.S. PATENT DOCUMENTS

| | | | | | |
|---|---|---|---|---|---|
| 5,329,558 | A | * | 7/1994 | Larsson et al. | 375/365 |
| 5,732,113 | A | | 3/1998 | Schmidl et al. | 375/355 |
| 5,946,292 | A | * | 8/1999 | Tsujishita et al. | 370/204 |
| 5,970,397 | A | * | 10/1999 | Klank et al. | 455/139 |
| 5,991,289 | A | * | 11/1999 | Huang et al. | 370/350 |
| 6,058,101 | A | * | 5/2000 | Huang et al. | 370/208 |
| 6,219,333 | B1 | * | 4/2001 | Ahn | 370/203 |
| 6,459,745 | B1 | * | 10/2002 | Moose et al. | 375/355 |
| 6,704,374 | B1 | * | 3/2004 | Belotserkovsky et al. | 375/326 |
| 6,711,221 | B1 | * | 3/2004 | Belotserkovsky et al. | 375/355 |
| 6,807,241 | B1 | * | 10/2004 | Milbar et al. | 375/343 |

OTHER PUBLICATIONS

Moose, P. "A technique for orthogonal frequency division multiplexing frequency offset correction", IEEE Transactions on Communications, vol. 42 , Issue: 10 , Oct. 1994, pp. 2908–2914.* van de Beek et al. "Time and frequency offset estimation in OFDM systems employing pulse shaping"; IEEE 6th International Conference on University Personal Communications Record, Oct. 12–16, 1997, vol. 1 pp. 279–283.*

* cited by examiner

*Primary Examiner*—Chieh M. Fan
*Assistant Examiner*—Jason M. Perilla
(74) *Attorney, Agent, or Firm*—Kenneth A. Haas

(57) ABSTRACT

An apparatus (300) for and method of synchronizing OFDM signals utilizes a single baud to provide synchronization in time, frequency, and per-subcarrier rotation (201). Timing and fractional subcarrier frequency synchronization may be obtained from either a known or unknown (e.g., data symbol) baud having known symmetry properties. Because all three synchronization tasks may be accomplished utilizing a single sync baud, the present invention is spectrally efficient. A differential correlation metric is utilized to efficiently provide integer subcarrier frequency synchronization and per-subcarrier rotation synchronization.

46 Claims, 4 Drawing Sheets

METHOD AND APPARATUS FOR SYNCHRONIZING AN OFDM SIGNAL

FIELD OF THE INVENTION

This invention relates to communication systems, including but not limited to synchronization of received signals.

BACKGROUND OF THE INVENTION

Synchronizing the transmitting and receiving hardware is a necessary step in achieving reliable, quality communications in wireless systems. The synchronization (sync) process includes frequency synchronization and timing synchronization. Frequency synchronization involves measuring and compensating for the difference in frequency between the transmitting hardware's oscillator and the receiving hardware's oscillator. Timing synchronization involves adjusting the receiver's decimation phase such that the ensuing demodulation process occurs at prespecified baud boundaries. Improper frequency synchronization results in a frequency offset in the received signal, while improper timing synchronization may result in intersymbol interference (ISI). In either case, large errors in synchronization may lead to unreliable and poor quality communications.

In single carrier digital communication systems, achieving proper synchronization is fairly straightforward and many solutions exist. In multicarrier, or orthogonal frequency division multiplexed (OFDM), systems, achieving accurate synchronization is more critical because synchronization errors may lead to not only ISI, but also inter-carrier interference (ICI). Moreover, while many OFDM systems utilize a guard interval in order to combat ISI due to channel multipath distortion, the guard interval may lead to ambiguity in the timing synchronization process.

A guard interval consists of a cyclic extension of an OFDM baud and is intended to absorb the multipath distortion in the channel and provide for one or more ISI-free sampling points. The receiver may adjust its decimation phase, allowing any samples in the original baud corrupted by ISI to be "replaced" by samples in the guard interval during demodulation. Baud boundary ambiguity arises because of the possible presence of more than one ISI-free sampling point. Adjusting the decimation phase to include samples from the guard interval may lead to phase rotation between successive OFDM subcarriers after demodulation, i.e., a subcarrier rotation offset. If ignored, this sampling phase-induced subcarrier rotation may cause channel estimation problems.

Accordingly, there is a need for a method of achieving synchronization in OFDM systems that is spectrally efficient and corrects undesirable subcarrier rotation.

DESCRIPTION OF A PREFERRED EMBODIMENT

The following describes an apparatus for and method of synchronizing OFDM signals in time, frequency, and per-subcarrier rotation. Timing and fractional subcarrier frequency synchronization may be obtained from either a known or unknown (e.g., data symbol) baud exhibiting known symmetry properties. Because all three synchronization tasks may be accomplished utilizing a single sync baud, the present invention spectrally efficient. A differential correlation metric is utilized to efficiently provide integer subcarrier frequency synchronization and per-subcarrier rotation synchronization.

Figure 1:
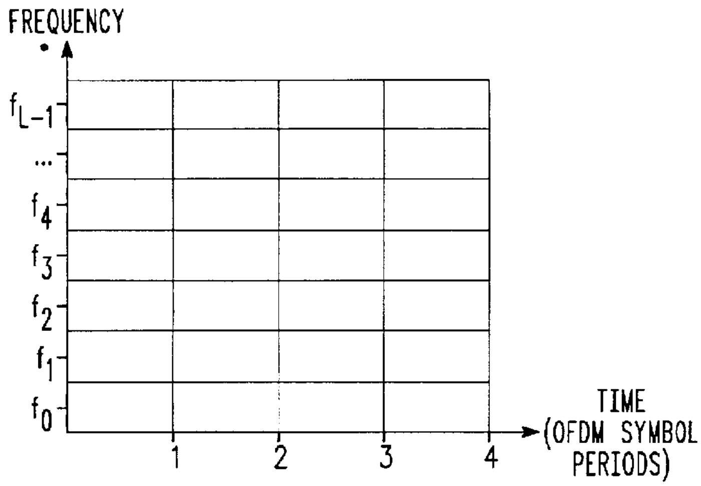
FIG. 1 is an example frequency-timing diagram of an OFDM signal structure in accordance with the invention.
Figure 2:
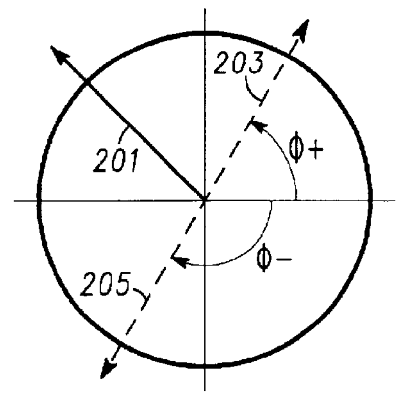
FIG. 2 is a diagram illustrating subcarrier rotation on a unit circle in accordance with the invention.

An example frequency-timing diagram of an OFDM signal structure is shown in FIG. 1. The OFDM signal is comprised of L subcarriers. A potentially different complex symbol may be represented on each of the L subcarriers during each OFDM symbol period or baud. The complex symbols are typically based on the constellation of a modulation scheme such as QPSK, 16-QAM, 64-QAM, BPSK, and so forth, although the present invention is not limited to these types of complex symbols. Thus, one symbol is transmitted in each box in FIG. 1. Each column of symbols in FIG. 1 will be referred to as an OFDM symbol or simply a baud. In order to reliably synchronize an OFDM signal, timing synchronization (sync), frequency sync, and subcarrier rotation are estimated and applied to the received signal. A diagram illustrating subcarrier rotation, also known as per-subcarrier rotation, is shown in FIG. 2 and will be described in greater detail below.

Figure 3:
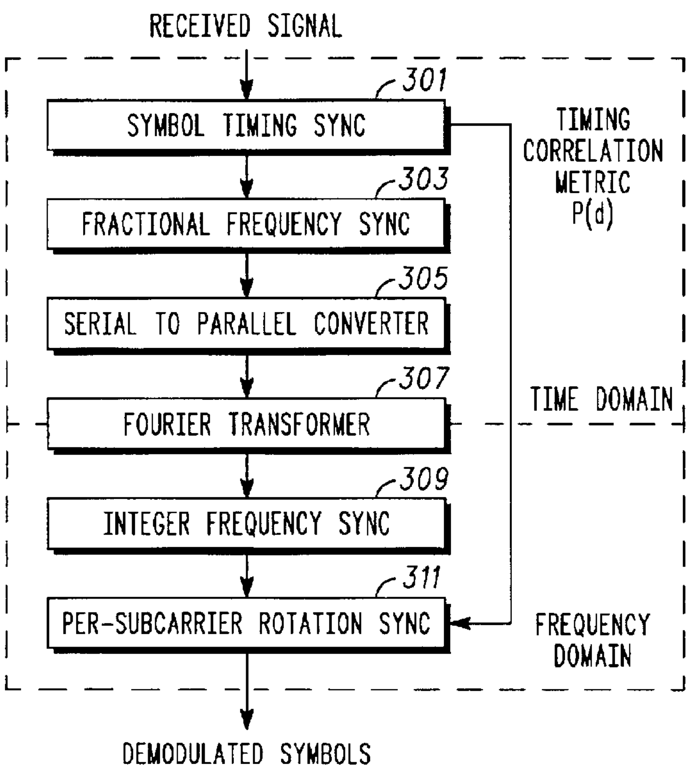
FIG. 3 is a block diagram of a synchronizer in accordance with the invention.

A block diagram of a synchronizer is shown in FIG. 3. The synchronizer 300 is part of a receiver, determines synchronization information (among other functions), and may be summarized as follows. A received signal including a sync baud that has been analog-to-digital (A/D) converted is input to a symbol timing synchronizer 301. The sync baud is a baud that preferably has known time-domain symmetry properties, as will be described later. The symbol timing synchronizer 301 determines the timing offset based on application of a timing correlation metric P(d) to the received signal and removes the timing offset from the received signal. The resultant signal is passed to a fractional subcarrier frequency synchronizer 303 that determines a fractional subcarrier frequency offset, i.e., the frequency offset of the received signal projected to the nearest subcarrier. The fractional subcarrier frequency offset is removed from the received signal, the signal is serial-to-parallel (S/P) converted in the serial-to-parallel converter 305 as appropriate and, optionally, the cyclic extension is discarded if one was transmitted, and the result is sent to a Fourier transformer 307 that performs a Fourier transform, such as a discrete fourier transform (DFT) or fast Fourier transform (FFT) that converts the received signal from the time domain to the frequency domain.

The frequency domain signal is sent to an integer subcarrier frequency synchronizer 309 that determines the integer subcarrier frequency offset that is an integer number of subcarrier multiples and removes the integer subcarrier frequency offset from the received signal. In one embodiment, the removal of the integer subcarrier frequency offset may be accomplished by adding the integer offset to the indices of the FFT output. The result may be input to a per-subcarrier rotation synchronizer 311 that determines and removes per-subcarrier phase rotation from the received signal (the per-subcarrier rotation is the portion of the phase change or phase offset per subcarrier that is not caused by the symbol values on the subcarriers), by utilizing the correlation metrics from the integer subcarrier frequency synchronizer 309 and the timing correlation metric P(d) from the symbol timing synchronizer 301, and outputs synchronized symbols.

As an example illustrating frequency offset, assume the subcarriers are separated by 9 kHz, and the total frequency offset is 11.25 kHz. The subcarrier frequency offset is the result of dividing the total frequency offset by the subcarrier separation, which is 11.25 k/9 k=1.25 in this example. The integer subcarrier frequency offset is 1 (or 9 kHz) and the fractional subcarrier frequency offset is 0.25 (or 2.25 kHz).

After the values for timing synchronization, fractional subcarrier frequency synchronization, integer subcarrier frequency synchronization, and subcarrier rotation, i.e., synchronization information, have been determined based on the sync baud, these values may be used to provide synchronized output symbols in subsequently received bauds, which may be passed to a data symbol detector. Any or all of the synchronization information may be utilized to update previously determined synchronization information. For example, for a particular sync baud, it may be advantageous to update only timing synchronization information, or fractional subcarrier frequency synchronization and integer subcarrier frequency synchronization, or even all of the synchronization information. For example, previously determined information may be combined with current information to determine a one or more pieces of synchronization information, or previously determined information may be used as a starting point to determine one or more pieces of current synchronization information.

When the sync baud is comprised of known symbols, such as when the sync baud is a training baud, the known symbols may be used to estimate the complex channel gain on the OFDM subcarriers. The complex channel gains may be used by the detector to correct for the complex channel gain before detecting the data symbols.

The synchronizer 300 requires only a single sync baud with known time-domain symmetry properties to acquire timing sync and fractional subcarrier frequency sync, and may also acquire timing sync, frequency sync, and subcarrier rotation sync when the sync baud is a training baud. In an embodiment where the sync baud is a training baud, the sync baud includes known symbols on certain subcarriers and null symbols on other subcarriers (i.e., unused or zero-valued subcarriers). In an embodiment where the sync baud is not a training baud, the sync baud includes unknown (such as data) symbols on certain subcarriers and null symbols on other subcarriers (i.e., unused or zero-valued subcarriers). In an alternate embodiment, the sync baud may include unknown (such as data) symbols on certain subcarriers, known symbols on certain other subcarriers, and null symbols on other subcarriers (i.e., unused or zero-valued subcarriers). The functions of each of the blocks of FIG. 3 will be described in greater detail below.

Figure 4:
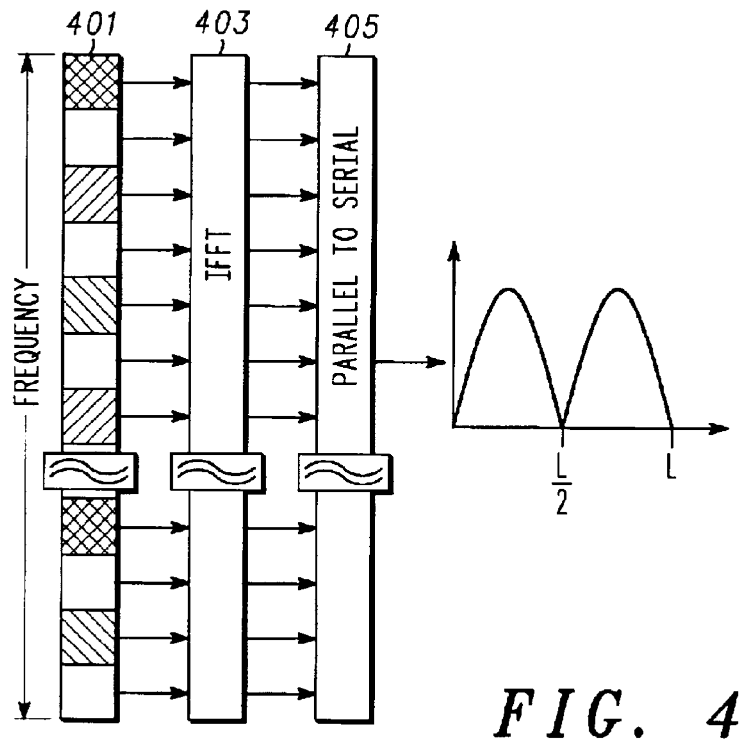
FIG. 4 is a diagram of a modulator that transmits a sync baud that exhibits half-symbol symmetry in accordance with the invention.

A diagram of a modulator that transmits an OFDM signal, including a sync baud that exhibits half-symbol symmetry, is shown in FIG. 4. A single sync baud 401 is shown with a box representing each separate subcarrier's symbol as frequency varies in the vertical direction. In other words, the sync baud 401 is transmitted across one time period of L samples, where L is the IFFT (Inverse Fast Fourier Transform) size or length, in each of the subcarrier frequency slots, or one column of FIG. 1. The single sync baud 401 is located, for example, at the beginning of each transmitted signal frame, although the sync baud may be located in a different part of the frame. In order to exhibit half-symbol symmetry in the transmitted time-domain signal for the sync baud, every other subcarrier transmits a null or zero symbol (illustrated as an empty box), e.g., a sequence of preferably known symbols is transmitted on the even-numbered OFDM subcarriers and null symbols are transmitted on the odd-numbered OFDM subcarriers. The known symbols may be transmitted at double power to maintain the same overall average transmit power across the transmitted signal. Some of the known symbols may also be set to zero without disturbing the symmetry properties. For example, OFDM subcarriers near the edges of the allowed channel bandwidth may be set to zero to ease analog filtering constraints, as is known in the art. Each subcarrier symbol is sent in parallel to an inverse FFT 403 that outputs its result to a parallel-to-serial converter 405. A guard interval or cyclic extension may be applied to the signal prior to the parallel to serial conversion process. The output of the parallel-to-serial converter 405 is digital-to-analog (D/A) converted, yielding a half-symbol symmetric signal (excluding the cyclic extension, if any), i.e., a waveform comprising two substantially identical versions of the same signal each with period L/2 due to only one-half of the subcarriers transmitting a signal. The analog signal is transmitted.

Figure 5:
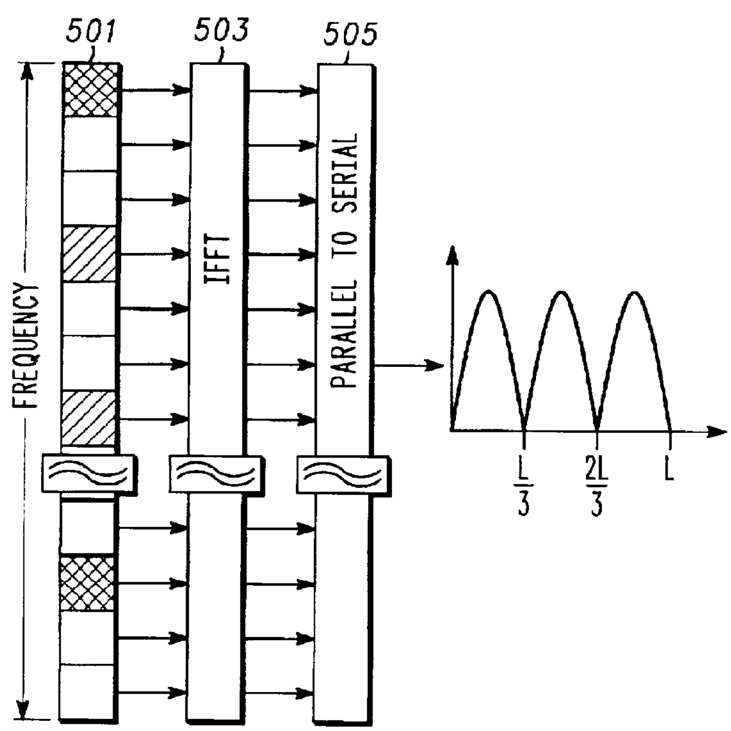
FIG. 5 is a diagram of a modulator that transmits a sync baud that exhibits (1/N)-symbol symmetry in accordance with the invention.

A diagram of a modulator that transmits a sync baud that exhibits (1/N)-symbol symmetry is shown in FIG. 5. N is an integer greater than or equal to two and is also less than the number of subcarriers. The example shown in FIG. 5 illustrates the condition where N=3. A single sync baud 501 is shown with a box representing each separate subcarrier's symbol as frequency varies in the vertical direction. The single sync baud 501 is located, for example, at the beginning of each transmitted signal frame, although the sync baud may be located in a different part of the frame. In order to exhibit (1/N)-symbol symmetry in the transmitted signal for the sync baud, a symbol is transmitted on every Nth subcarrier and a null or zero symbol (illustrated as an empty box) is transmitted on the remaining subcarriers, i.e., a sequence of preferably known symbols is transmitted on every Nth OFDM subcarrier and null symbols are transmitted on the remaining OFDM subcarriers. The known symbols may be transmitted at N times the power to maintain the same average transmit power for the transmitted signal. Some of the known symbols may also be set to zero without disturbing the symmetry properties. For example, OFDM subcarriers near the edges of the allowed channel bandwidth may be set to zero to ease analog filtering constraints, as is known in the art. Each subcarrier symbol is sent in parallel to an L-point inverse FFT 503 that outputs its result to a parallel-to-serial converter 505. A guard interval or cyclic extension may be applied to the signal prior to the parallel to serial conversion process. The output of the parallel-to-serial converter 505 is D/A converted, yielding a (1/N)-symbol symmetric signal (excluding the cyclic extension, if any), i.e., a waveform comprising N substantially identical versions of the same signal each with period L/N due to 1/N of the subcarriers transmitting a signal. The analog signal is transmitted.

In an embodiment where the sync baud is a training baud, the known symbols of the sync baud are assumed to be placed on every Nth input to the IFFT in such a way that one of the known symbols is placed on the DC or 0 Hz subcarrier in complex baseband representation. This constraint means that for an IFFT that computes $$x(l)=\frac{1}{\sqrt{L}}\sum_{i=0}^{L-1}X(i)e^{j\frac{2\pi li}{L}}\ \text{for } 0\le l\le L-1,$$

the known symbols are placed on the subcarriers i=0, i=N, i=2N, and so on. The invention is also applicable when the known symbols of the sync baud are mapped to every Nth subcarrier in a different way. A different mapping than the one described above causes a known sequence of phase shifts between the symmetric portions of the sync baud. Those skilled in the art may modify the equations provided in the preferred embodiment to account for the phase shifts. For example, if N=2 and the known symbols are mapped to i=1, i=N+1, i=2N+1, and so on, then the second half of the time-domain sync baud waveform will have a phase shift of 180 degrees compared to the first half. Because the phase shift of the second half is predetermined or known, the second half is still considered to be symmetric to the first half.

In an embodiment where the sync baud is a not a training baud, the unknown symbols (such as data) of the sync baud are assumed to be placed on every Nth input to the IFFT in such a way that one of the data symbols is placed on the DC or 0 Hz subcarrier in complex baseband representation. This constraint means that for an IFFT that computes $$x(l)=\frac{1}{\sqrt{L}}\sum_{i=0}^{L-1}X(i)e^{j\frac{2\pi li}{L}}\ \text{for } 0\le l\le L-1,$$

the data symbols are placed on the subcarriers i=0, i=N, i=2N, and so on. The invention is also applicable when the data symbols of the sync baud are mapped to every Nth subcarrier in a different way. A different mapping than the one described above causes a known sequence of phase shifts between the symmetric portions of the sync baud. Those skilled in the art may modify the equations provided in the preferred embodiment to account for the phase shifts. For example, if N=2 and the data symbols are mapped to i=1, i=N+1, i=2N+1, and so on, then the second half of the time domain sync baud waveform will have a phase shift of 180 degrees compared to the first half. Because the phase shift of the second half is predetermined or known, the second half is still considered to be symmetric to the first half.

A receiver receives the transmitted analog signal and A/D converts it. The resultant received signal is then appropriately processed to obtain timing, frequency, and preferably per-subcarrier rotation sync. The following example shows determination of timing sync, frequency sync, and per-subcarrier rotation sync, in that order, for an embodiment where the sync baud is a training baud. In an embodiment where the sync baud is not a training baud, the steps for timing sync and fractional frequency sync are the same as for an embodiment where the sync baud is a training baud.

Timing sync is obtained by the symbol timing synchronizer 301. The present invention may be utilized in both a sync acquisition state and a sync tracking or maintenance state. In the acquisition state, the receiver searches in the time domain for an OFDM baud having all N identical segments, indicating that the sync baud is present. For example, when N=2, the receiver searches for a baud having first and second halves that are identical. The sync baud is found when |P(d)| is maximized. This initial searching process occurs in the time domain, i.e., prior to FFT demodulation. Assuming that the OFDM symbol duration, excluding the cyclic extension, is L samples, the search may be accomplished using the following timing correlation metric when N=2:

$$P(d)=\frac{\sum_{m=0}^{\frac{L}{2}-1}r^*(d+m)r\left(d+m+\frac{L}{2}\right)}{\sqrt{\sum_{m=0}^{\frac{L}{2}-1}r^*(d+m)r(d+m)}\cdot\sqrt{\sum_{m=0}^{\frac{L}{2}-1}r^*\left(d+m+\frac{L}{2}\right)r\left(d+m+\frac{L}{2}\right)}}$$

where r is a received sample (after A/D conversion and before FFT), and d is the time index. For the general case where N is an integer greater than one, a correlation metric may be computed as $$P(d)=\frac{1}{N-1}\sum_{k=0}^{N-2}\left(\frac{\left(\sum_{m=0}^{\frac{L}{N}-1}r^*\left(d+m+k\frac{L}{N}\right)r\left(d+m+(k+1)\frac{L}{N}\right)\right)}{\left(\sqrt{\sum_{m=0}^{\frac{L}{N}-1}r^*\left(d+m+k\frac{L}{N}\right)r\left(d+m+k\frac{L}{N}\right)}\sqrt{\sum_{m=0}^{\frac{L}{N}-1}r^*\left(d+m+(k+1)\frac{L}{N}\right)r\left(d+m+(k+1)\frac{L}{N}\right)}\right)}\right),$$

which may be viewed as a scaled sum of correlations between the symmetric parts of the sync baud. For example, the first term (k=0) includes the correlation between the first and second symmetric portions. The next term includes the correlation between the second and third symmetric portions, and so on.

Correlation metric equations that are defined differently than the equations given for P(d) herein may also be used without departing from the scope of the invention. Those skilled in the art may consider different forms of correlations metrics. Examples of different forms of correlation metric include, but are not limited to the following. The summations over m imply a rectangular processing window. The rectangular window may be replaced with a different type of window, such as a recursive exponentially decaying window. A different type of normalization of the correlation metric may be used, i.e., the denominator may be modified. It is also possible to eliminate the normalization of the metric, i.e., by setting the denominator to one, although this elimination causes the correlation magnitude to be dependent on the received signal power. The correlation metric for N>2 may be modified to include contributions from symmetric portions that are not adjacent. For example, when N=4, the correlation equation given above includes correlations between the following symmetric portions: first and second, second and third, third and fourth. The correlation metric may be modified to also include correlations between the non-adjacent symmetric portions, such as: first and fourth, first and third, second and fourth. This modification may improve the robustness of the correlation metric to channel noise.

From an implementation viewpoint, calculating the numerator of P(d) is similar to performing differential demodulation on samples spaced by L/N and integrating the differential demodulator output over a length L/N rectangular window. The proper decimation phase, i.e., timing sync, occurs at the point $d_{opt}$, where the magnitude of the timing correlation metric is maximized:

$$d_{opt} = \underset{d}{\operatorname{argmax}} |P(d)|.$$

Because the search process includes the OFDM cyclic extension, the valid region of the correlation function will look more like a "plateau" than a single spike. The presence of channel multipath distortion does not affect the N-segment symmetry (e.g., for N=2, first half/second half symmetry) of the sync baud, but may result in a narrower correlation plateau. Because the effects of a constant channel phase cancel when correlating the N segments of the baud, at the proper decimation phase, the only phase shift between the N segments of the baud results from a frequency offset. Because of the nature of fixed frequency offsets, samples separated by a constant time period have a constant phase shift between them. Taking the magnitude of the metric eliminates the effect of frequency offset on timing synchronization.

Once timing synchronization is established, the fractional subcarrier frequency synchronizer 303 determines the fractional subcarrier frequency offset and removes it from the received signal. The angle or phase of the timing correlation metric computed at the proper decimation phase, $d_{opt}$, i.e., the timing sync point, is utilized to obtain the fractional subcarrier frequency offset, $\gamma_1$, as shown below:

$$\gamma_1 = \angle P(d_{opt}) \cdot \frac{\Delta f}{\pi},$$

where Δf is the subcarrier spacing in Hz. As mentioned earlier, the timing correlation metric, P(d), may be viewed as the integral of a differential demodulator's output. Therefore, the phase of the correlation metric is equal to the signal's average rotation over a length L/N time interval, which, in turn, is directly related to the underlying fractional subcarrier frequency offset. Because of the inherent aliasing in computing angles, $\gamma_1$ does not estimate the integer part of the frequency offset when the frequency offset is greater than N/2 subcarriers. Correcting a received signal by $-\gamma_1$ Hz, however, ensures that the frequency offset remaining in the signal is an integer multiple of the subcarrier spacing. The fractional subcarrier frequency synchronizer 303 removes the fractional subcarrier frequency offset $\gamma_1$ from the received signal. The remaining integer part of the frequency offset may be removed by the integer subcarrier frequency synchronizer 309, as will be described later.

The present invention provides for the ability to determine timing sync and fractional subcarrier frequency offset from either a known sync baud (training baud) or an unknown sync baud, such as a data baud with certain subcarriers set to zero. Thus, timing and fractional subcarrier frequency offset sync may be obtained and/or periodically checked on any transmitted baud having 1/N symmetry.

The fast Fourier transformer 307 transforms the sync baud by performing an FFT on the received signal, excluding any cyclic extension, as known in the art. The integer subcarrier frequency synchronizer 309 measures the remaining or integer subcarrier frequency offset. Advantageously, the integer subcarrier frequency synchronizer 309 determines the integer subcarrier frequency offset without requiring a second sync baud to be transmitted, thereby utilizing better spectral efficiency than prior methods that transmit two training bauds for synchronization. Generally, the integer subcarrier frequency synchronizer 309 utilizes a differential correlation metric. The differential correlation metric compares the known changes between non-zero subcarrier symbols to the changes observed between non-zero subcarrier symbols from the received sync baud.

Figure 6:
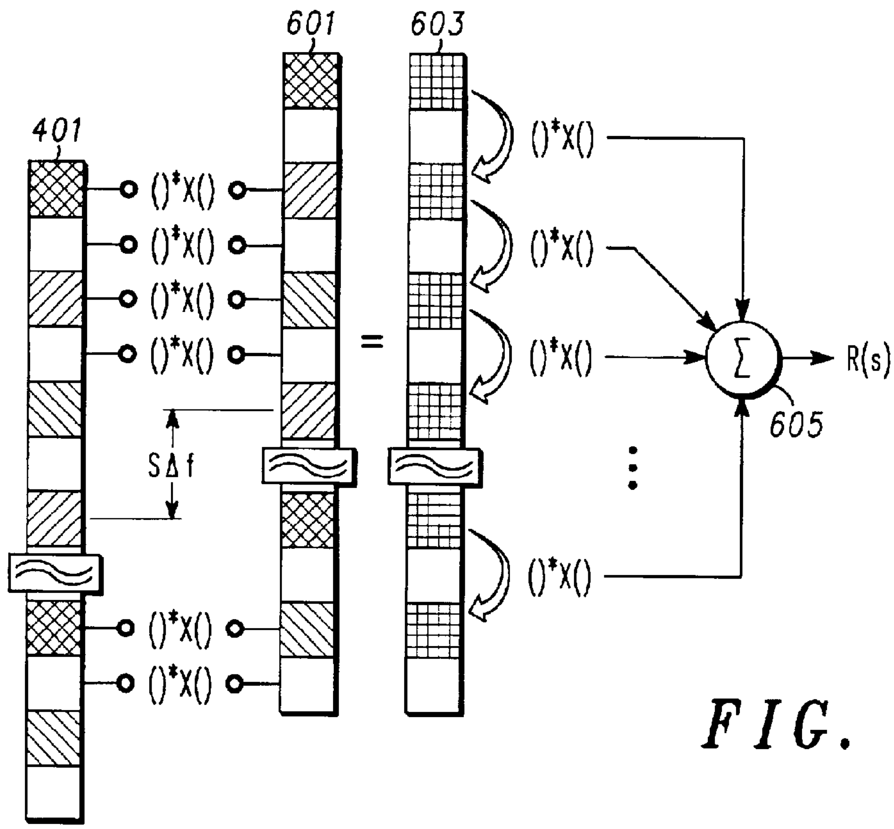
FIG. 6 is a diagram showing differential correlation for a sync baud that exhibits half-symbol symmetry in accordance with the invention.
Figure 7:
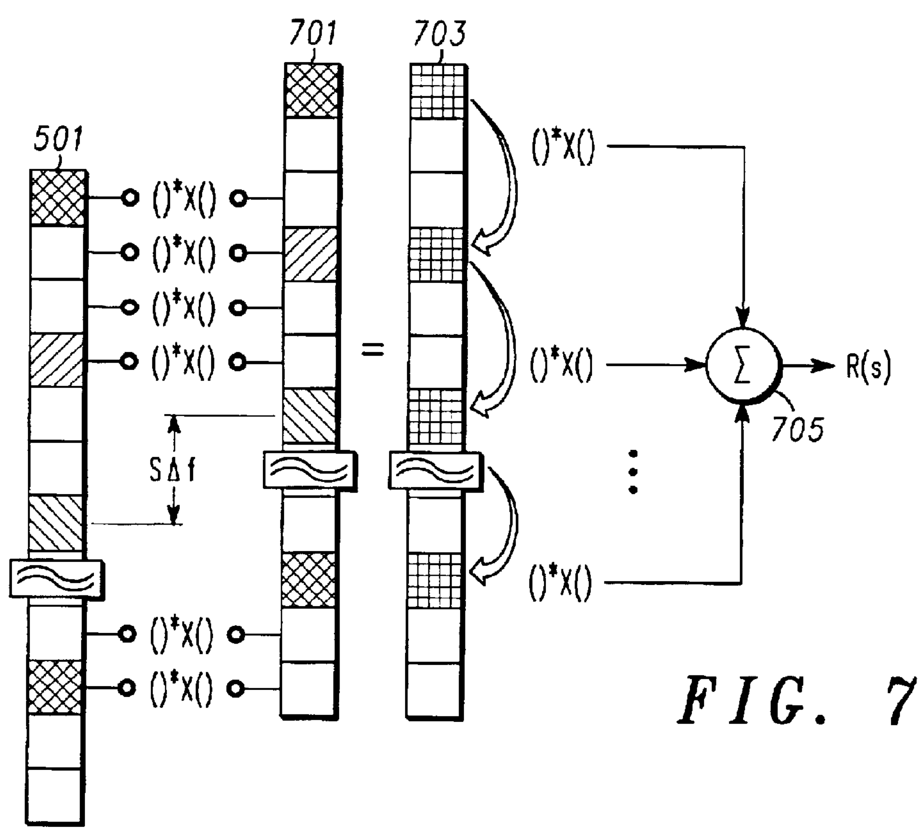
FIG. 7 is a diagram showing differential correlation for a sync baud that exhibits (1/N)-symbol symmetry in accordance with the invention.

The integer subcarrier frequency synchronizer 309 measures and corrects for the remaining integer part of the frequency offset. Measuring and correcting the remaining frequency offset utilizes the value of the symbols transmitted on the Nth subcarriers in the sync baud. In the example where N=2 and the known symbols are placed on even-numbered subcarriers, the value of the even subcarriers is utilized. A differential correlation is performed between the known symbols and various subcarrier-shifted versions of the FFT output symbols to determine the integer subcarrier frequency offset. The subcarrier shift resulting in the largest differential correlation give a measure of the integer subcarrier frequency offset. FIG. 6 illustrates an example of a differential correlation where N=2, and FIG. 7 illustrates an example of a differential correlation where N=3.

A diagram showing differential correlation for a sync baud that exhibits half-symbol symmetry is shown in FIG. 6. In this example, the sync baud is a training baud comprised of known symbols transmitted on even subcarriers and null symbols transmitted on odd subcarriers. The complex symbols 601 output by the demodulator's FFT 307 are denoted by y(k) 601 and that the known symbols modulated onto the even subcarriers are given by x(k) 401, then the differential correlation metric is represented as follows:

$$R(s) = \sum_{k=0}^{L-3} [x^*(k)y((k+s)\mathrm{mod}L)]^* \cdot [x^*(k+2)y((k+2+s)\mathrm{mod}L)],$$

where s is the instantaneous subcarrier shift being considered, and k is the subcarrier index. If, for example, s=2, then a shift of two subcarriers between the received signal and the known signal is being evaluated. The differential correlation metric is illustrated in FIG. 6.

The complex conjugate of a known symbol 401 is multiplied by a symbol from a shifted version of the FFT output 601. The correlation may also be performed by shifting the known symbols instead of the FFT output symbols. For the positions where the sync baud symbols are zero, the result of the multiplication is also zero. After all sync baud symbols have been multiplied by the corresponding symbol from the shifted FFT output, the results may be placed into a "baud" 603 that has zeros on every other subcarrier. Consecutive non-null symbols in the resultant baud 603 are multiplied together, i.e., the null subcarriers are skipped, with one as complex conjugate, and the result is added, yielding R(s). The integer subcarrier frequency offset, $\gamma_2$, is computed using the following formula:

$$\gamma_2 = \Delta f \cdot s_{rem} \text{ where } s_{rem} = \underset{s}{\operatorname{argmax}} |R(s)|.$$

$\gamma_2$ occurs at the shift $s_{rem}$ of the received signal 601 where the magnitude of R(s) is maximized. The effects of a constant channel phase cancel when correlating differentially in frequency. Therefore, at the appropriate subcarrier offset, $s_{rem}$, any phase shift remaining in the differential correlation metric may be attributed to sampling phase induced subcarrier rotation. Taking the magnitude of the differential correlation metric isolates the frequency synchronization process from the effects of subcarrier rotation. Thus, the present invention provides the ability to determine the integer subcarrier frequency offset using only a single sync baud.

R(s) may also be written in a different but equivalent form given by $$R(s) = \sum_{k=0}^{L-3} [x(k)x^*(k+2))] \cdot [y((k+s)\bmod L \cdot y^*((k+2+s)\bmod L)],$$

which would lead to a different interpretation than FIG. 6.

A diagram showing differential correlation for a sync baud that exhibits (1/N)-symbol symmetry is shown in FIG. 7. In this example, N=3, and the sync baud is comprised of known symbols transmitted on every N, i.e., 3, subcarriers and null symbols transmitted on the remaining subcarriers. The complex symbols 701 output by the demodulator's FFT 307 are denoted by y(k) 701 and that the known symbols are given by x(k) 501, then the differential correlation metric is represented as follows:

$$R(s) = \sum_{k=0}^{L-4} [x^*(k)y((k+s)\bmod L)] \cdot [x^*(k+3)y((k+3+s)\bmod L)],$$

where s is the instantaneous subcarrier shift being considered, and k is the subcarrier index. The differential correlation metric is illustrated in FIG. 7. The complex conjugate of a known symbol 501 is multiplied by a symbol from a shifted version of the FFT output 701. The correlation may also be performed by shifting the known symbols instead of the FFT output symbols. For the positions where the sync baud symbols are zero, the result of the multiplication is also zero. After all sync baud symbols have been multiplied by the corresponding symbol from the shifted FFT output, the results may be placed into a "baud" 703 that has zeros on two of every three subcarriers. Consecutive non-null symbols in the resultant baud 703 are multiplied together, i.e., the null subcarriers are skipped, with one as complex conjugate, and the result is added, yielding R(s). The integer subcarrier frequency offset, $\gamma_2$, is computed using the following formula:

$$\gamma_2 = \Delta f \cdot s_{rem} \text{ where } s_{rem} = \underset{s}{\operatorname{argmax}} |R(s)|.$$

$\gamma_2$ occurs at the shift $s_{rem}$ of the received signal 701 where the magnitude of R(s) is maximal.

An additional aspect of the present invention is the estimation and correction of subcarrier rotation. Once frequency synchronization is established, the per-subcarrier rotation synchronizer 311 utilizes the angle of the differential correlation metric evaluated at the subcarrier offset, $s_{rem}$, to obtain an initial estimate of N times the per-subcarrier rotation 201 of FIG. 2, as shown below for N=2:

$$2\phi = \angle R(s_{rem}).$$

Because of the inherent aliasing in computing angles, the above estimate may give an incorrect result if it is simply divided in half in order to compute the true per-subcarrier rotation. As shown graphically in FIG. 2, the above equation has two possible solutions, one positive 203 and one negative 205:

$$\phi_+ = \max\left(\frac{\angle R(s_{rem})}{2}, \left[\frac{\angle R(s_{rem})}{2} + 2\pi\right]\bmod 2\pi - \pi\right)$$

and $$\phi_- = \min\left(\frac{\angle R(s_{rem})}{2}, \left[\frac{\angle R(s_{rem})}{2} + 2\pi\right]\bmod 2\pi - \pi\right).$$

The positive solution assumes that the chosen decimation phase occurs $$\phi + \frac{L}{2\pi}$$

samples after the beginning of the non-extended portion of the OFDM baud, where L is the number of samples in the baud excluding the cyclic extension, while the negative solution assumes that the chosen decimation phase occurs $$\phi - \frac{L}{2\pi}$$

samples before the beginning of the non-extended portion of the OFDM baud. In order to determine which solution yields the true per-subcarrier rotation, the original symbol timing correlation function, P(d), is utilized to check for the beginning of the non-extended portion of the OFDM baud. The values comprising P(d) do not need to be recalculated because they were computed earlier as part of the initial timing sync process from block 301.

Figure 8:
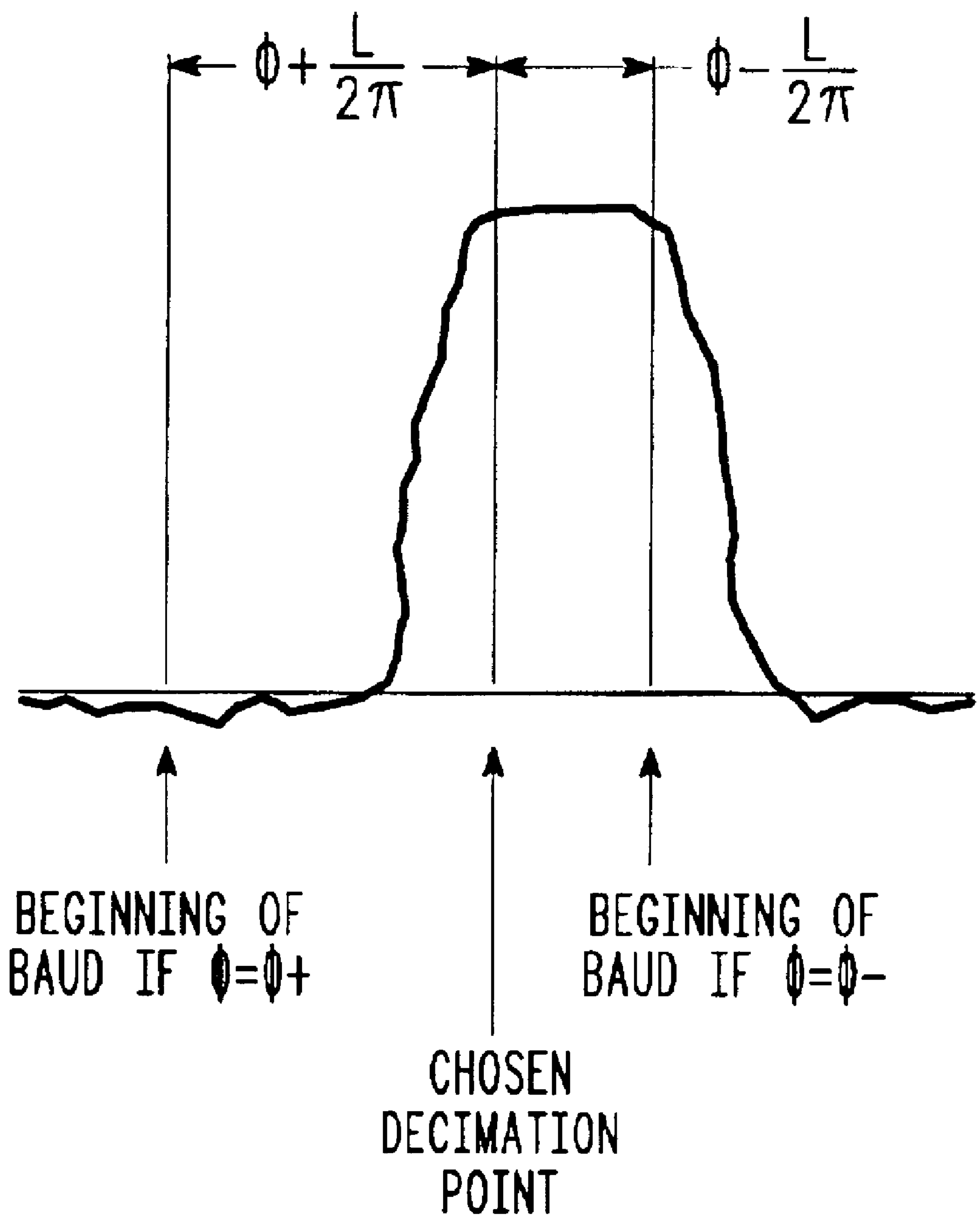
FIG. 8 is a diagram illustrating subcarrier rotation on a timing diagram in accordance with the invention.

A diagram illustrating subcarrier rotation versus time is shown in FIG. 8. A timing correlation plateau of approximately $$\phi - \frac{L}{2\pi}$$

in width is shown by the chosen decimation point from the timing sync process and the beginning of the baud when $\phi=\phi+$. A point $$\phi + \frac{L}{2\pi}$$

prior to the chosen decimation point is the beginning of the baud when $\phi=\phi-$. Thus, the timing correlation metric is utilized to find the per-subcarrier rotation offset $\phi$. When the overall length of the guard interval is less than half the baud length (which is normally the case in OFDM systems), only one of the possible baud beginnings lies on the timing correlation plateau. The other baud beginning lies within the noise floor. The final choice for the per-subcarrier rotation phase becomes:

$$\phi = \begin{cases} \phi_+ \text{ if } \left|P\left(d_{opt} - \phi_+ \frac{L}{2\pi}\right)\right| > \left|P\left(d_{opt} - \phi_- \frac{L}{2\pi}\right)\right| \\ \phi_- \text{ if } \left|P\left(d_{opt} - \phi_- \frac{L}{2\pi}\right)\right| < \left|P\left(d_{opt} - \phi_+ \frac{L}{2\pi}\right)\right|. \end{cases}$$

The performance of the present synchronization method in tracking mode is similar to that in acquisition mode, except that the number of computations is reduced. Timing correlations that search for a baud with N identical segments need only be performed over a small region near the current decimation phase and only while a sync baud is received. Moreover, assuming minimal oscillator drift and a fairly constant channel, only the fractional subcarrier frequency correction involving the angle of the timing correlation metric need be performed, and the more computationally intensive post-FFT-correlation may be avoided. When the post-FFT-correlation is needed, a subset of the subcarriers may be used to compute the integer subcarrier frequency offset and the per-subcarrier rotation phase.

The present invention provides a number of advantages over prior OFDM sync methods. The present invention is spectrally efficient, i.e., has low overhead. Unlike prior art synchronization methods that require two or more OFDM training bauds, the present invention utilizes at most one OFDM sync baud. Moreover, by replacing some of the known symbols in the sync baud with random data symbols, this overhead may be further reduced. The initial (1/N)-symbol timing correlation process looks for a baud whose N segments are identical because only every Nth subcarrier contains a non-zero symbol. Whether these symbols consist of known symbols or random data symbols has no impact on this process. Reducing the number of known symbols implies that the post-FFT correlation used to measure subcarrier shift and per-subcarrier rotation operates over a shorter sample size. The present method accomplishes all three stages of synchronization: timing, frequency and subcarrier (or per-subcarrier) rotation. Many prior OFDM synchronization methods do not address per-subcarrier rotation. As a result, the present invention does not suffer from channel estimation problems that may result from neglecting the per-subcarrier rotation. The present invention is not computationally complicated. The present invention may use the discrete fourier transform (DFT) or similar transforms in place of the FFT if needed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:

receiving a single orthogonal frequency division multiplexed (OFDM) symbol that exhibits 1/N symbol symmetry, where N is an integer greater than or equal to 2;

determining a timing synchronization of the single OFDM symbol by applying a correlation metric to the single OFDM symbol; and determining from the single OFDM symbol an integer subcarrier frequency offset of the single OFDM symbol.

2. The method of claim 1, further comprising the step of determining a fractional subcarrier frequency offset from the single OFDM symbol.

3. The method of claim 2, further comprising the step of removing the fractional subcarrier frequency offset from the single OFDM symbol.

4. The method of claim 1, wherein the step of determining the integer subcarrier frequency offset comprises the step of applying a differential correlation to a frequency-shifted version of the single OFDM symbol.

5. The method of claim 1, further comprising the step of performing a Fourier transform on the single OFDM symbol prior to determining the integer subcarrier frequency offset.

6. The method of claim 1, further comprising the step of determining a subcarrier rotation from the single OFDM symbol.

7. The method of claim 6, wherein the step of determining the subcarrier rotation comprises the step of determining an angle of a maximum differential correlation of a frequency-shifted version of the single OFDM symbol.

8. The method of claim 1, further comprising the step of utilizing at least the timing synchronization to provide synchronized output symbols in subsequently received bauds.

9. The method of claim 1, wherein the step of determining the timing synchronization comprises the step of utilizing the correlation metric to update a previously determined timing synchronization.

10. The method of claim 1, wherein the single OFDM symbol is an OFDM synchronization (sync) baud.

11. The method of claim 1, wherein the single OFDM symbol comprises at least one data symbol.

12. The method of claim 1, wherein N is an integer greater than or equal to 3.

13. The method of claim 1, wherein the method is performed by a wireless receiver.

14. A method comprising the steps of:

receiving a single orthogonal frequency division multiplexed (OFDM) symbol;

determining from the single OFDM symbol a timing synchronization of the OFDM symbol;

determining from the single OFDM symbol a fractional subcarrier frequency offset of the single OFDM symbol;

removing the fractional subcarrier frequency offset from the single OFDM symbol;

determining from the single OFDM symbol an integer subcarrier frequency offset of the single OFDM symbol.

15. The method of claim 14, wherein the step of determining the integer subcarrier frequency offset comprises the step of applying a differential correlation to a frequency-shifted version of the single OFDM symbol.

16. The method of claim 14, further comprising the step of determining a subcarrier rotation from the single OFDM symbol.

17. The method of claim 16, wherein the step of determining the subcarrier rotation comprises the step of determining an angle of a maximum differential correlation of a frequency-shifted version of the single OFDM symbol.

18. The method of claim 14, further comprising the step of utilizing at least one of the timing synchronization, the fractional subcarrier frequency offset, and the integer subcarrier frequency offset to provide synchronized output symbols in subsequently received bauds.

19. The method of claim 14, further comprising the step of utilizing at least one of the timing synchronization, the fractional subcarrier frequency offset, and the integer subcarrier frequency offset to update previously determined synchronization information.

20. The method of claim 14, wherein the single OFDM symbol exhibits 1/N symbol symmetry, where N is an integer greater than or equal to 2.

21. The method of claim 14, further comprising the step of performing a Fourier transform on the single OFDM symbol prior to determining the integer subcarrier frequency offset.

22. The method of claim 14, wherein the single OFDM symbol is an OFDM synchronization (sync) baud.

23. The method of claim 14, wherein the method is performed by a wireless receiver.

24. An apparatus comprising:

a timing synchronizer, arranged and constructed to obtain, from the single OFDM symbol, a timing synchronization of a single orthogonal frequency division multiplexed (OFDM) symbol;

a fractional subcarrier frequency synchronizer, operably coupled to the timing synchronizer, wherein the fractional subcarrier frequency synchronizer is arranged and constructed to obtain, from the single OFDM symbol, fractional subcarrier frequency synchronization of the single OFDM symbol; and an integer subcarrier frequency synchronizer, operably coupled to the fractional subcarrier frequency synchronizer, wherein the integer subcarrier frequency synchronizer is arranged and constructed to obtain, from the single OFDM symbol. integer subcarrier frequency synchronization of the single OFDM symbol.

25. The apparatus of claim 24, wherein the fractional subcarrier frequency synchronizer is further arranged and constructed to remove a fractional subcarrier frequency offset from the single OFDM symbol.

26. The apparatus of claim 24, wherein the integer subcarrier frequency synchronizer is arranged and constructed to apply a differential correlation to a frequency-shifted version of the single OFDM symbol.

27. The apparatus of claim 24, further comprising a subcarrier rotation synchronizer, operably coupled to the integer subcarrier frequency synchronizer and the timing synchronizer, wherein subcarrier rotation is arranged and constructed to obtain subcarrier rotation synchronization on the single OFDM symbol.

28. The apparatus of claim 27, wherein the subcarrier rotation synchronizer is further arranged and constructed to determine an angle for a maximum differential correlation of a frequency-shifted version of the single OFDM symbol.

29. The apparatus of claim 24, further comprising a Fourier transformer that converts the single OFDM symbol to a frequency domain signal.

30. The apparatus of claim 24, wherein the single OFDM symbol is an OFDM synchronization (sync) baud.

31. The apparatus of claim 24, wherein the apparatus is disposed in a wireless receiver.

32. A method comprising the steps of:

receiving a single orthogonal frequency division multiplexed (OFDM) symbol;

determining an integer subcarrier frequency offset of the single OFDM symbol by applying a differential correlation metric to the OFDM symbol removing a fractional subcarrier frequency offset of the single OFDM symbol determined from the single OFDM symbol prior to the determining step.

33. The method of claim 32, further comprising the step of removing a fractional subcarrier frequency offset from the single OFDM symbol prior to the determining step.

34. The method of claim 32, wherein the step of determining the integer subcarrier frequency offset comprises the step of applying the differential correlation metric to a frequency-shifted version of the single OFDM symbol and a known OFDM synchronization (sync) baud.

35. The method of claim 32, wherein the integer subcarrier frequency offset is found at a subcarrier shift resulting in a maximum for the differential correlation metric.

36. The method of claim 32, further comprising the step of determining subcarrier rotation by determining an angle of a maximum of the differential correlation metric.

37. The method of claim 32, wherein the differential correlation metric comprises applying the equation $$R(s) = \sum_{k=0}^{L-3} [x^*(k)y((k+s)\mathrm{mod}L)]^* \cdot [x^*(k+2)y((k+2+s)\mathrm{mod}L)],$$

where y(k) denotes complex received symbols, x(k) denotes known symbols, L is a Fourier transform size, s is an instantaneous subcarrier shift being considered, and k is a subcarrier index.

38. The method of claim 32, wherein the integer subcarrier frequency offset, $y_2$, is computed using the following formula $$\gamma_2 = \Delta f \cdot s_{rem} \text{ where } s_{rem} = \underset{s}{\mathrm{argmax}} |R(s)|,$$

where Δf is subcarrier spacing, s is an instantaneous subcarrier shift being considered and |R(s)| is the magnitude of the differential correlation metric.

39. A method comprising the steps of:

receiving a single orthogonal frequency division multiplexed (OFDM) symbol that exhibits 1/N symbol symmetry, where N is an integer greater than or equal to 2;

determining from the single OFDM symbol a subcarrier rotation of the single OFDM symbol, determining from the single OFDM symbol an integer subcarrier frequency offset of the single OFDM symbol.

40. The method of claim 39, further comprising the step of determining timing synchronization from the single OFDM symbol by applying a correlation metric to the single OFDM symbol.

41. The method of claim 39, further comprising the step of determining a fractional subcarrier frequency offset from the single OFDM symbol.

42. The method of claim 39, further comprising the step of determining an integer subcarrier frequency offset from the single OFDM symbol.

43. The method of claim 39, further comprising the step of utilizing at least the subcarrier rotation to provide synchronized output symbols in subsequently received bauds.

44. The method of claim 39, further comprising the step of utilizing at least the subcarrier rotation to update previously determined synchronization information.

45. The method of claim 39, wherein the single OFDM symbol is an OFDM synchronization (sync) baud.

46. The method of claim 39, wherein the method is performed by a wireless receiver.

* * * * *